(12) United States Patent
Katsuragawa

(10) Patent No.: US 6,993,872 B2
(45) Date of Patent: Feb. 7, 2006

(54) LIGHT CONTROL WINDOW

(75) Inventor: Tadao Katsuragawa, Kanagawa-ken (JP)

(73) Assignee: Ricoh Company, LTD, Tokyo (JP)

( * ) Notice: Subject to any disclaimer, the term of this patent is extended or adjusted under 35 U.S.C. 154(b) by 0 days.

(21) Appl. No.: 10/448,412

(22) Filed: May 30, 2003

(65) Prior Publication Data
US 2004/0074165 A1    Apr. 22, 2004

(30) Foreign Application Priority Data
May 30, 2002    (JP)    .............................. 2002-158353

(51) Int. Cl.
G02B 5/30 (2006.01)
E04C 2/54 (2006.01)

(52) U.S. Cl. ..................... 52/173.3; 52/171.3; 359/484

(58) Field of Classification Search ............... 52/173.3, 52/171.3; 359/494, 495, 280, 484
See application file for complete search history.

(56) References Cited

U.S. PATENT DOCUMENTS

| 4,854,265 A | 8/1989 | Ohta et al. |
| 4,960,072 A | 10/1990 | Ohta et al. |
| 5,112,466 A | 5/1992 | Ohta et al. |
| 5,112,701 A | 5/1992 | Katsuragawa |
| 5,152,111 A * | 10/1992 | Baughman et al. ........ 52/171.3 |
| 5,245,471 A * | 9/1993 | Iwatsuka et al. ............ 359/494 |
| 5,991,075 A | 11/1999 | Katsuragawa et al. |
| 6,055,215 A | 4/2000 | Katsuragawa |
| 6,187,431 B1 | 2/2001 | Katsuragawa |
| 6,243,193 B1 | 6/2001 | Katsuragawa |

FOREIGN PATENT DOCUMENTS

| JP | 01-093702 | 4/1989 |
| JP | 06-199528 | 7/1994 |
| JP | 11-247093 | 9/1999 |
| JP | 2000-047032 | 2/2000 |

* cited by examiner

Primary Examiner—Basil Katcheves
(74) Attorney, Agent, or Firm—Oblon, Spivak, McClelland, Maier & Neustadt, P.C.

(57) ABSTRACT

A light control window that includes at least a transparent window substrate and an optical element. The optical element includes at least an optical element main body configured to change the light transmittance through the window upon application of a magnetic field. The optical element main body includes at least a micro-magnetic head array configured to apply the magnetic field to the optical element main body.

33 Claims, 4 Drawing Sheets

LIGHT CONTROL WINDOW

BACKGROUND OF THE INVENTION

1. Field of the Invention

The present invention relates to a window taking in and blocking outside light for use in automobiles, buildings, etc., and more particularly to a new light control window having a light control capability using a layer having a magneto-optic effect.

2. Discussion of the Background

Windows of buildings such as office buildings and plants usually have separate means, such as shutters and curtains, so that the inside of the buildings cannot be seen from the outside. Typically, the shutter and curtain mechanically transfer alight shield to transmit or block light. In addition, a window of an automobile has the same means.

On the other hand, the following methods have been tried to perfectly shield the window of a building and automobile without covering the whole area thereof:

(1) a method of fitting two pieces of an inexpensive film polarizer to a window and mechanically rotating the polarizers to transmit or block light;

(2) a method of electrically transmitting and blocking light, using a liquid crystal plate between glasses of a window instead of rotating the polarizers; and (3) a method of using electrochromism technologies, e. g., a technology controlling a transmitted light volume by forming a thin film of $WO_3$ or $NiO_2$ on a window, and installing upper and under transparent electrodes applying a voltage of a few volts to color the window.

However, the above-mentioned conventional technologies have the following problems:

The first method can control a light volume, but needs a space larger than the size of the window to mechanically rotate the light polarizers, which have a light transmittance of 50%;

The second method does not need a space for rotation and can block light at a comparatively high speed, but does not solve the low light transmittance of the first method. In addition, application of the voltage has to be continuous to block light, and further the liquid crystal has to be included with a precise interval between the glasses, which is difficult for a large area; and The third method, although having a higher light utilization efficiency and being more improved than the first and second methods, has the following drawbacks:

(1) $WO_3$ becomes blue and $NiO_2$ becomes brown when colored, and these colors are not preferable for windows;

(2) application of the voltage also has to be continuous in order to decrease the transmitted light volume by coloring and a large electric power is necessary for a large area, which is not practical; and (3) the light transmittance is about 70% when fully opened and 20% when completely closed, which is insufficient. In particular, the 20% light transmittance when the window is completely closed is a large drawback in practical use.

Because of these reasons, a need exists for a window having a light control capability of continuosly and easily changing light transmittance at a high speed without the need of a mechanical transfer.

SUMMARY OF THE INVENTION

Accordingly, one of the objects of the present invention is to provide a light control window:

(1) capable of continuosly changing a light transmittance at a high speed and with ease without a mechanical transfer;

(2) capable of changing continuously the light transmittance between a light transmittance not less than 50% and a light transmittance close to 0%;

(3) having a good light control capability with a material just attached to the window and easily exchanged;

(4) largely reducing electric energy to control light and an amount thereof; and (5) capable of controlling light, having a large area, a light weight and being difficult to break.

Briefly this object, and other objects of the present invention as hereinafter will become more readily apparent, can be attained by a light control window which includes a transparent window substrate and an optical element. The optical element main body is configured to change the light transmittance of the window upon application of a magnetic field, which includes a micro-magnetic head array configured to apply the magnetic field to the optical element main body.

The optical element main body includes a first polarization layer; a second polarization layer or a polarization changing layer; and a layer having a magneto-optic effect located between the first polarization layer and the second polarization layer or polarization changing layer. These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same become better understood from the detailed description when considered in connection with the accompanying drawings in which like reference characters designate like corresponding parts throughout, wherein.

DETAILED DESCRIPTION OF THE PREFERRED EMBODIMENTS

Generally, the present invention provides a window capable of controlling a light volume, basically including an optical element changing a light transmittance thereof by application of a magnetic field, and another optical element including a transparent micro-magnetic head array applying the magnetic field to the first optical element. Namely, the window can repeatedly have a high and a low light transmittance by application of a magnetic field to the transparent magnetic head array. The light transmittance can be changed between high and low settings in the two steps, a plurality of steps, or continuously.

Figure 1:
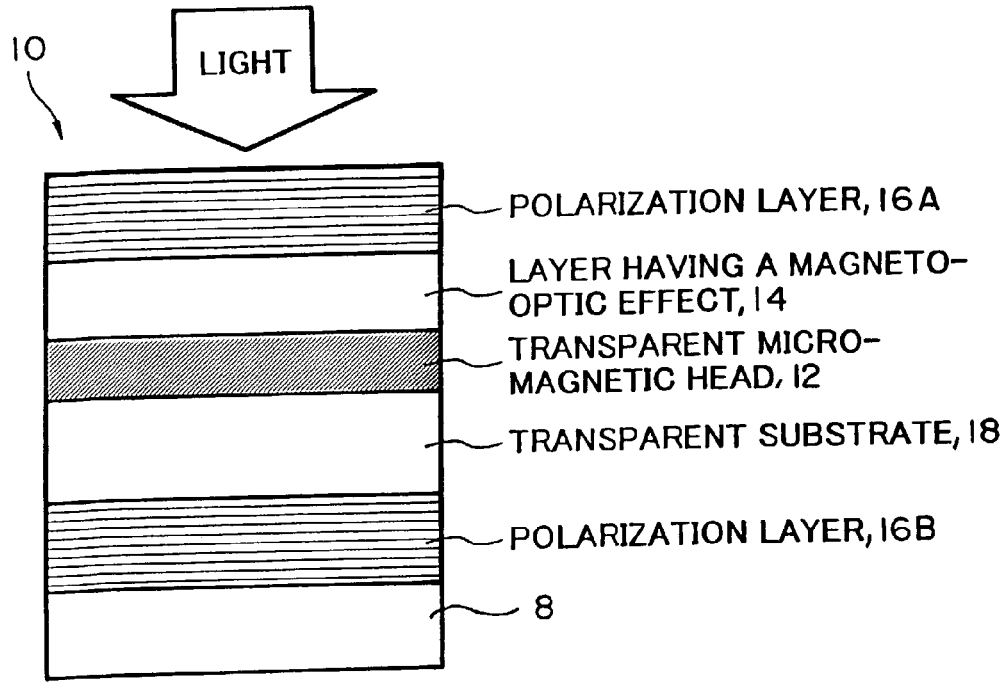
FIG. 1 is a schematic view illustrating a cross section of an embodiment of the light control window of the present invention.

FIG. 1 illustrates an embodiment of a typical structure of the light control window 10 of the present invention next to a transparent window substrate 8. The light control window 10 includes a transparent micro-magnetic head array 12, a layer 14 having a magneto-optic effect, or Faraday effect, a first light polarization layer 16A on a side of a transparent substrate 18, and a second light polarization layer 16B on the other side thereof. It is also possible to exchange the position of the transparent micro-magnetic head array 12 with that of the layer 14 having a magneto-optic effect with respect to the transparent substrate 18. The main light direction is indicated by an arrow in FIG. 1. In this embodiment, the window surface facing the outside of a room is on the side of the outer surface of the second light polarization layer 16B.

In the present invention, when the layer 14 having a magneto-optic effect has a light polarizing capability, the window has only one light polarization layer, i.e., the light polarization layer 16 B adjacent to the outer surface of the window.

Figure 2:
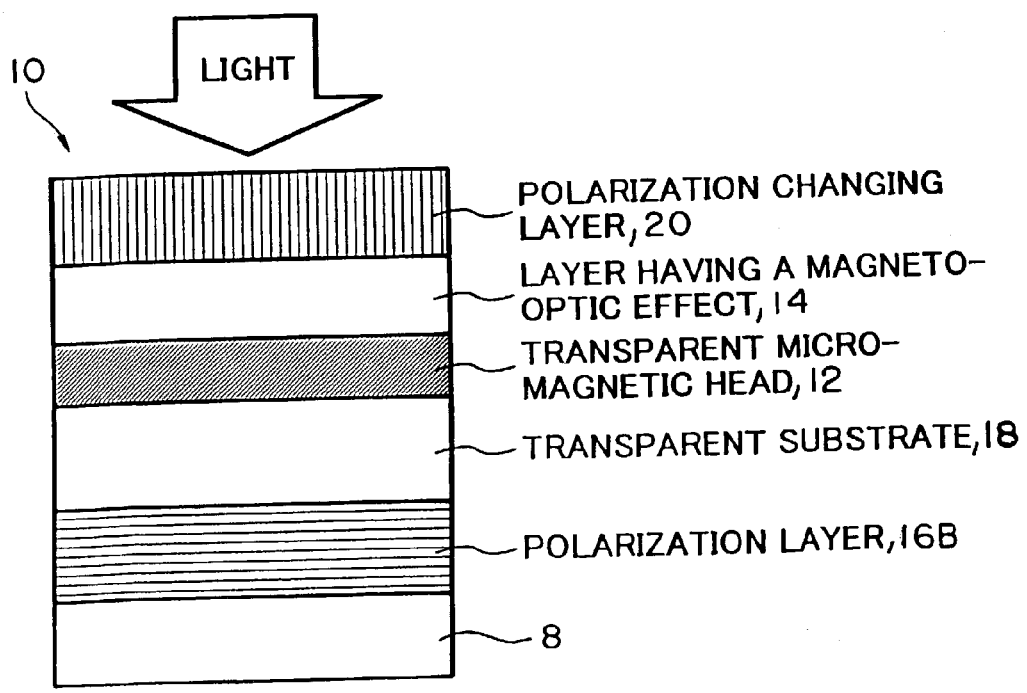
FIG. 2 is a schematic view illustrating a cross section of another embodiment of the light control window of the present invention.

In addition, in the present invention, as illustrated in FIG. 2, a polarization changing layer 20 can replace the first light polarization layer 16A. In this case, the polarization changing layer 20 is preferably formed as the outer surface of the light control window. Also, in the present invention, the polarization changing layer 20 separates circular light into S and P polarized light and changes either of the light into only S or P polarized light.

Figure 3A:
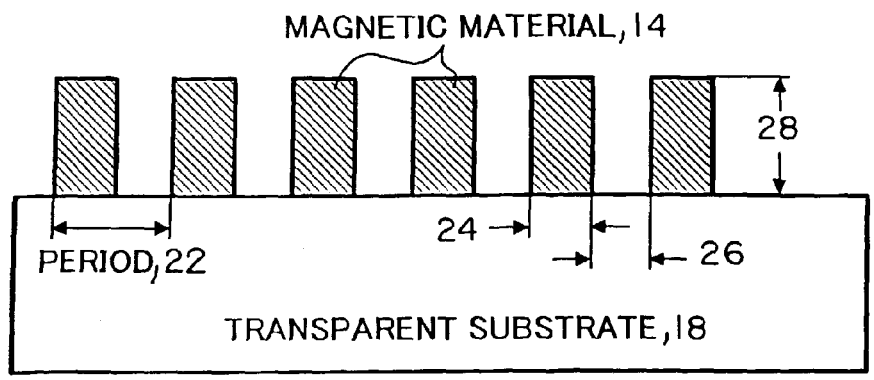
FIGS. 3A and 3B are schematic cross-sectional views illustrating a substrate layer with the magneto-optic effect of the present invention disposed on a surface of the substrate creating periodic grooves.
Figure 3B:
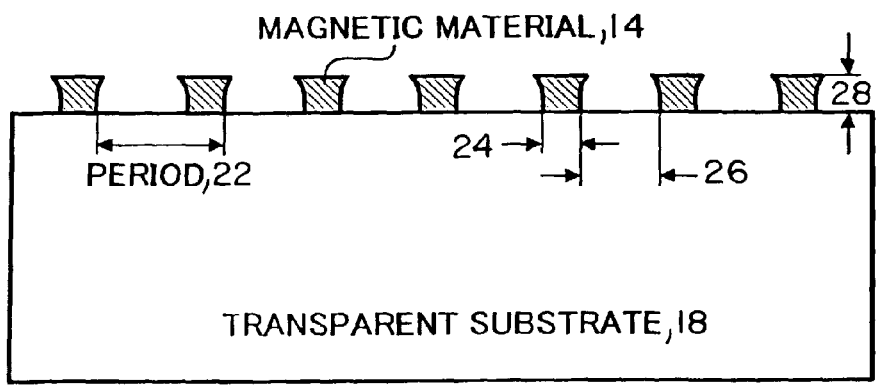

Further, in the present invention, the layer 14 having the magneto-optic effect can be disposed in layers in which the magnetic materials form periodic grooves as FIGS. 3A and 3B show. In this case, the light polarization layer 16B toward the inside of the room does not have to be formed because the layers of magnetic materials forming the periodic grooves has a capability of a light polarizer. A period 22 of the grooves, having a width 24 and separated from each other by a distance 26, is preferably not greater than a visible wavelength of 400 nm, and more preferably from 50 to 400 nm. However, magnetic materials 14 forming the grooves do not diffract transmitted light like a light polarizer does. In addition, the layer of magnetic materials forming the periodic grooves is preferably used because it has both high transparency and a high magneto-optic effect. The groove preferably has a height 28 from 5 nm to 1 µm. The cross-section of the periodic structure does not have to be rectangular, and may be that of a wave form.

Circular light passing through the light polarization layer 16A (or polarization changing layer 20) of the present invention from outside of a room becomes linearly polarized light P or S. When a magnetic field is applied to the layer 14 having a magneto-optic effect by the transparent micromagnetic head array 12, the layer having a magneto-optic effect is magnetized or demagnetized, and rotates a plane of polarization of the linearly polarized light depending on magnetization of the circular light from outside of the room. The rotated linearly polarized light can or cannot pass the following light polarization layer, and therefore the light transmittance differs. Therefore, the light polarizer in the light polarization layer toward the inside of the room has a polarizing axis in a predetermined direction such that the light having the plane of polarization can pass the layer.

The light control principle of the present invention will be explained by an embodiment of a structure having, from the outer most layer to the layer next to the external window surface, a polarization changing layer 20, a layer 14 having a magneto-optic effect, a transparent micro-magnetic head array 12, a transparent substrate 18 and a light polarization layer 16B as shown in FIG. 2.

In this embodiment, circular light passing through the polarization changing layer 20 from the outside of the room becomes linearly polarized light P or S. When the linearly polarized light passes through the layer 14 having a magneto-optic effect, which is magnetized by the transparent micro-magnetic head array 12, a plane of polarization of the linearly polarized light is rotated. The linearly polarized light, having the rotated plane of polarization, cannot pass the following light polarization layer 16B (because directions of polarizing axes of the polarization changing layer and light polarization layer are previously adjusted such that the linearly polarized light cannot pass the light polarization layer), and a light shielding effect is exerted. When the layer 14 having a magneto-optic effect is not magnetized, the linearly polarized light passes through the transparent micromagnetic head array 12, and further the light polarization layer 16B. The directions of polarizing axes of the polarization changing layer 20 and light polarization layer 16B may previously be adjusted such that the linearly polarized light passes through the transparent micro-magnetic head array 12 and light polarization layer 16B when the layer 14 having a magneto-optic effect is demagnetized or magnetized in the reverse direction.

A magnetizing strength of the layer 14 having a magneto-optic effect can be changed by an electric current applied to the transparent micro-magnetic head array 12. Therefore, a rotating angle of the linearly polarized light can be changed and the transmitting light volume can continuously or optionally be controlled. In addition, a choice of the head in the micro-magnetic head array 12, i.e., a choice of a head passing the light or a head blocking the light, can control the whole light transmittance. As a matter of course, a combination of the above-mentioned methods can be used.

In this embodiment, polarization-changed light in the polarization changing layer 16B is almost P polarized light and a maximum light transmittance is close to 100%. This is largely improved compared with the conventional technologies. In addition, the linearly polarized light rotated for 90 degrees (not necessarily 90 degrees) cannot pass the light polarization layer 16B, and the light transmittance is almost 0%.

It is difficult in principle for light inside the room to pass the light control window of the present invention in the reverse direction; the light inside the room hardly escapes outside. When a light polarization layer 16A is used instead of the polarization changing layer 20, the light inside the room can escape outside although the transmittance efficiency is slightly lower. In the embodiment of the present invention, light from outside to inside of a room is controlled, but are not limited thereto. When a strong light is irradiated through the polarization changing layer 20, the embodiment of the present invention can be used as a light shutter shielding the light. In order to make the light control window of the present invention like an ordinary window through which things can be seen from outside and inside, the layer 14 having a magneto-optic effect may have a structure in which magnetic materials are disposed forming periodic grooves as shown in FIGS. 3A and 3B. For example, the window includes a polarization changing layer, a transparent micro-magnetic head array, a layer having a magneto-optic effect and a transparent substrate, and does not include a light polarization layer. The layer having a magneto-optic effect has a periodic lattice structure of magnetic materials on the transparent substrate, which has a shorter period than a visual light wavelength. Visual light does not diffract because the periodic lattice structure has a shorter period than the visual light wavelength and transmits the structure. In addition, the periodic lattice structure has a capability of a light polarizer because it has the same shape of a wire grid polarizer. Therefore, not only a light polarizer is unnecessary, but also incident light from the layer having a magneto-optic effect becomes linearly polarized light and passes through the polarization changing layer as it is, and things can be seen from outside and inside. In addition, the periodic magnetic materials 14 in FIGS. 3A and 3B have the same effect even when connected to each other. The structure has an advantage of improving light utilization efficiency because a light polarization layer 16 decreasing light transmittance is not used. A period 22 of the grooves having a width 24 and being spaced from each other by a distance 26, is preferably not greater than a visible wavelength of 400 nm, and more preferably from 50 to 400 nm, and the groove preferably has a height 28 from 5 nm to 1 $\mu$m. The cross-section of the periodic structure does not have to be a rectangle, and may be that of a wave form.

The micro-magnetic head array 12, the layer 14 having a magneto-optic effect and the transparent substrate for use in the present invention preferably have light transmittances close to 100%. Therefore, a ITO film, a ZnO film, a transparent organic conductive film are examples of films that are typically and preferably used as a wiring layer in the micro-magnetic head array 12.

A solar battery is preferably used as an electric source for driving the transparent micro-magnetic head array 12, and it is more preferable to use a solar battery having a visual light transmittance. The solar battery installed on a part of a windowpane has to be neither exchanged nor charged like a secondary cell. It is needless to say that known electric power supply methods can be used other than the solar battery. The magnetic field strength of the micro-magnetic head array 12 can be manually controlled using switches such as volume switches. However, it is preferable to control the magnetic field strength according to an outside light strength with a light sensor installed on a side of the polarization changing layer, i.e., the stronger the out side light, the more the current to decrease the light transmittance; the weaker the outside light, the less will be the current to maintain an almost fixed light volume.

A current applied to the micro-magnetic head arrays 12 which are all connected in series can instantly control light. Wiring of the micro-magnetic head array 12 may be separated to wiring in the direction of X and Y (orthogonal wiring) and intersectional portions of coils may individually be controlled to control the light volume.

In the present invention, the layer 14 having a magneto-optic effect has an advantage of having a reaction speed of about 1,000 times than a liquid crystal because the layer is used as an optical rotatory element. Besides, the layer has another advantage of being semi-permanently magnetized once magnetized, i.e., light control can semi-permanently be maintained without energy consumption.

In addition, in the present invention, a shell including a liquid such as liquid crystals at a uniform interval is not necessary, and just a solid thin layer film having a thickness of about 1 pm can make the structure simple, lightweight and have a large area.

Further, the light control window of the present invention can use a windowpane as the transparent substrate, and can directly form the optical element thereon. The optical element formed on a plastic film as the transparent substrate may be laminated on the windowpane, which can reinforce the windowpane, easily be released therefrom and have a flexible shape.

The respective elements forming the light control window of the present invention will be explained.

First, the layer 14 having a magneto-optic effect (Faraday effect) will be explained. Materials for use in the layer having a magneto-optic effect are not limited, but particularly, transparent magnetic materials having a large magneto-optic effect are preferably used. Such transparent magnetic materials include transparent magnetic layers having a large magneto-optic effect suggested by the present inventor, which are constituted of combined films of plural dielectric films and magnetic films, and so-called typical transparent magnetic recording materials. Further, in the present invention, a layer mentioned later can be used as the layer having a magneto-optic effect.

Two embodiments of the transparent magnetic layer constituted of a multilayer film including dielectric and magnetic films, which is preferably used in the present invention, will be explained.

Figure 4:
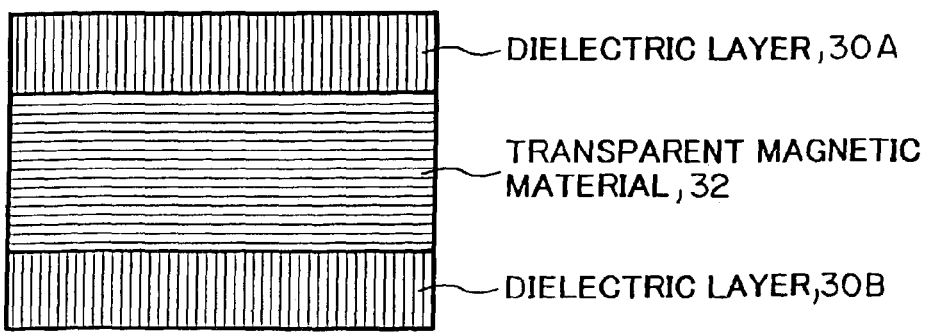
FIG. 4 is a schematic cross-sectional view illustrating a structure configured to increase the magnetic effect of the present invention.

First, a first combined transparent magnetic layer has the following layer composition:

$$\{(GM)_n(MG)_n\}_m$$

wherein G is a dielectric layer and M is a magnetic layer. An order of G and M reverses, e.g., M G follows GM. Namely, M has to be a point of symmetry. FIG. 4 shows a case in which n and m are 1, and n and m are preferably from 1 to 40. The transparent magnetic layer has an optical thickness, n·d, of ¼ wavelength, wherein n is a refractive index of the layer and d is a layer thickness.

A second combined transparent magnetic layer has two layers of the above-mentioned G, having a high refractive index and a low refractive index.

Various materials mentioned later can be used as the materials for the dielectric layer and the magnetic layer.

When the layer having a magneto-optic effect of the present invention includes the dielectric layer, suitable materials for use therein include transparent and heat resistant materials such as metal or metalloid oxides, nitrides, chalcogenides, fluorides, carbides and their mixtures. Specific examples of the materials include $SiO_2$, $SiO$, $Al_2O_3$, $GeO_2$, $In_2O_3$, $Ta_2O_5$, $TeO_2$, $TiO_2$, $MoO_3$, $WO_3$, $ZrO_2$, $Si_3N_4$, AlN, BN, TiN, ZnS, CdS, CdSe, ZnSe, ZnTe, AgF, $PbF_2$, $MnF_2$, $NiF_2$, SiC or their mixtures. Materials having a different refractive index from that of the transparent magnetic layer may be selected from these materials. Each of the layers preferably has a thickness from 5 to 200 nm, and more preferably from 5 to 30 nm. The dielectric layer may have plural layers. The layers can be formed by various PVD and CVD methods.

Specific examples of the typical transparent magnetic materials for use in the layer having a magneto-optic effect of the present invention include oxides such as Co ferrite and Ba ferrite; materials having a large double reflex such as $FeBO_3$, $FeF_3$, $YFeO_3$ and $NdFeO_3$; MnBi; MnCuBi; and PtCo. These can be used when the thickness of the layer is reduced so as to have transparency, which can be combined with the dielectric layer. Inorganic magnetic materials having high transparency include n-type $Zn_{1-x}V_xO$, Co-doped $TiO_2$, etc. In addition, a rare-earth iron garnet having the following formula can be used as the transparent magnetic material having a uniform and good performance index over visual light.

$$R_{3-x}A_xFe_{5-y}B_yO_{12}$$

wherein x is greater than 0.2 and less than 3, and y is not less than 0 and less than 5; R is a rare earth metal which is at least one of Y, Sm, Eu, Gd, Th, Dy, Ho, Er, Tm, Yb and Lu; A is at least one of Bi, Ce, Pb, Ca and Pt; and B is at least one of Al, Ga, Cr, Mn, Sc, In, Ru, Rh, Co, Fe, Cu, Ni, Zn, Li, Si, Ge, Zr and Ti.

The rare-earth iron garnet is preferably used as a material for a windowpane because of having a large ultraviolet absorption coefficient. In addition, even a thin film of the rare-earth iron garnet can control infrared light transmittance because of imparting a large Faraday angle thereto, and coloring of the window can largely be reduced.

Further, organic magnetic materials can preferably be used as the transparent magnetic materials in the present invention. Specific examples of the materials include a vanadiumchromehexacyano complex $K^I_{0.63}V^{III}[Cr^{III}(CN)_6]_{0.88}7.5H_2O\ 0.4EtOH$, $K^I[(V^{II}_{0.6}V^{III}_{0.4})_xCr^{II}_{1-x}][Cr^{III}(CN)_6]$, etc. According to a composition ratio of metal ion $X= V^{II/III}/Cr^{II}$, the latter changes its color, i.e., blue when X=1, light blue when X=0.3, green when X=0.22 and transparent when X=0. The layer is formed by an electrochemical synthesizing method. Such colored windowpanes can be obtained without particular colorization.

Further, the transparent organic and inorganic magnetic materials can be combined to form the layer. A large difference of refraction index between the organic and inorganic magnetic materials confines more light and a larger Faraday rotation angle can be obtained.

The layer having a magneto-optic effect preferably has a coercivity not greater than 1,000 Oe, and more preferably from 10 to 300 Oe by adjusting the composition. The smaller the coercivity, the smaller the energy for magnetic writing, and therefore, the magnetic head can easily be prepared. However, when the coercivity is too small, it is erased by a permanent magnet. In this respect, the coercivity is preferably from 10 to 300 Oe. When the coercivity is from 10 to 300 Oe, even a lattice rectangular magnetic head formed of a linear wiring layer can obtain a sufficient strength of a magnetic field and magnetize a magnetic material unless it is a voluminous coiled magnetic head. The layer having a magneto-optic effect preferably has a thickness from about 50 nm to 10 μm, and 50 nm to 2 μm when only a strong magnetic material is used.

In addition, the materials for use in the layer having a magneto-optic effect preferably have a magnetic anisotropy perpendicular to the layer because the magneto-optic effect is most effectively exerted when light direction and spinning direction of the material are parallel.

Any of the magnetic materials in the layer having a magneto-optic effect has less coercivity with heat. Therefore, an auxiliary heater buried in the windowpane can reduce the head current for recording and erasing. Needless to say, it is not preferable to use such a large amount of heat as it erases all the coercivity. Particularly, the auxiliary heater is effectively used for the rare-earth iron garnet when designed to have a compensation temperature at a room temperature because it has a difficulty in erasing at the room temperature, but can easily rewrite with a small magnetic field when slightly heated.

The layer including the transparent magnetic materials can be formed by the conventional PVD methods, CVD methods or electroplating methods such as sputtering methods, vacuum deposition methods, MBE methods, ion plating methods, pulse laser deposition methods and laser flash methods.

Ultra-fine particles prepared by coprecipitation methods may be formed on a substrate by coating methods, electroplating methods or puttering methods. The PVD methods and sol-gel methods need to heat the rare-earth iron garnet at almost 650° C. to crystallize the rare-earth iron garnet. An ultraviolet laser anneal methods may be used after forming an amorphous layer at a low substrate temperature because the rare-earth iron garnet has a high ultraviolet absorbency and the PVD methods capable of forming high-quality magnetic layers needs an expensive high vacuum apparatus. The electroplating and coating methods using crystallized fine particles cannot avoid light dispersion due to the fine particles in the layer, and the transparency is slightly misty.

The puttering methods are conventionally used to coat metals, etc. to harden or modify a surface thereof, which forms a thin layer thereon by passing crystallized fine particles in a high temperature such as plasma to melt and discharge them at a high speed onto a substrate. Many puttering methods are developed according to the melting methods, such as plasma puttering methods, jet coat puttering methods and rokide puttering methods. The methods have an advantage of being capable of forming a layer on a substrate having a low temperature of not greater than 100° C. The fine particles are heated at a temperature not less than 1,000° C. and pressurized to be applied to the substrate in a convergent jet stream from a nozzle at a supersonic speed of from mach 2 to 5. The applied fine particles have a low temperature on the substrate and a layer can be formed even on, e.g., a plastic substrate. When the fine particle diameter is small, a thin layer having the same properties as those of a layer formed by the PVD methods, such as surface smoothness and uniform thickness, can be formed. In particular, a layer can be formed in air by the puttering methods at a lower cost than those of the PVD and CVD methods needing a high vacuum apparatus.

Next, the transparent substrate will be explained.

The transparent substrates for use in the present invention include plastic films such as MMA, PMMA, ABS resins, polycarbonate, polypropylene, acrylic resins, styrene resins, polyarylate, polysulfone, polyethersulfone, epoxy resins, poly-4-methylpentne-1, fluorinated polyimide, fluorocarbon resins, phenoxy resins, polyolefin resins and nylon resins other than typical glasses, transparent ceramics, quartz, etc.

The transparent substrates for use in the present invention are not limited thereto, and transparent glass papers disclosed in, e.g., Japanese Patent No. 2538527 and Japanese Laid-Open Patent Publication No. 11-247093 can be used. Organopolysiloxane for use in preparation for the transparent glass papers is an alcohol-soluble and hydrolyzable organic metallic compound, which is represented by $R_3SiO$ $(R_2SiO)nSiR_3$, $(R_2SiO)n$, etc. having a high molecular weight.

The transparent substrate of the present invention can have a thickness from about 10 μm to 10 mm depending on a purpose and a material.

In addition, a transparent colored substrate can be used as the transparent substrate of the present invention. A transparent substrate tinted by a dye or a pigment capable of not only changing the light transmittance but also coordinating the color thereof can be designed because the color of the tinted transparent substrate becomes apparent when the magnetization is adjusted to increase transparency of the window.

Next, the polarization layer will be explained.

Various polarizing films which are commercially available can be used as the polarization layer. The polarizing films are broadly classified into multi-halogen polarizing films, dye polarizing films and metallic polarizing films.

In addition, the following polarizers can be used, but are not limited thereto:

(1) A polarizing plate on which a number of sticks formed of strong magnetic fine particles are located and fixed in a fixed direction, which is easily produced and has good optical properties, disclosed in Japanese Laid-Open Patent Publication No. 1-93702.

(2) A Wire Grid Polarizer

A polarizer in which gold or aluminium lines are formed at a microscopic interval on a transparent substrate, mentioned on page 103 in "Modem Physics-Light & Magnetism" written by Katsuaki Satoh from Tokyo University of Agriculture and Technology, published by Asakura Co., Ltd. in 1988, in which light having a wavelength λ much longer than a interval d of the lines becomes almost complete linearly polarized light having a plane of vibration perpendicular to the line when passed through the polarizer. In such cases, the polarization degree is about 97%.

(3) Polar Core from Dow Corning Corp.

A glass including extended silver metals located in a fixed direction has polarization properties, which has much better heat resistance, humidity resistance, chemical resistance and laser resistance than conventional organic polarizers. This is mainly used for infrared light, and a special specification thereof is available for visual light.

(4) Multilayer Polarizer

Professor Shojiro Kawakami from the Electrical Communication Laboratory of Tohoku University disclosed this multilayer polarizer in 1991, which is prepared by laminating Ge (germanium) having a thickness from 6 to 8 nm and $SiO_2$ having a thickness of 1 μm alternately until the total thickness thereof becomes 60 μm. A performance index $α_{TE}/αTM$ (a fading constant ratio between a TE wave and a TM wave) is close to 400 when measured with light having a wavelength of 0.6 pm. An optical quenching ratio is 35 dB and an insertion loss is 0.18 dB when measured with light having a wavelength of 0.8 μm. Therefore, the multilayer polarizer can sufficiently be used.

(5) Reflective Polarizer

Sumitomo 3M, Ltd. sells the reflective polarizer. Hundreds of thin films having different refractive indices are layered, in which light repeats reflecting and transmitting among the layers to become polarized light. Either S or P polarized light is reflected or transmitted. The reflective polarizer has a total thickness of about 100 μm. Compared with an absorption type, the image of the reflective polarizer seems bright because of reflection. In addition, a wire grid type reflective polarizer is available from MOXTEK, Inc. in USA.

(6) Polarizing Beam Splitter

Beam splitters separate or synthesize a luminous flux into two or more beams. The polarizing beam splitter separates a luminous flux into two or more beams having different polarized directions. The polarizing beam splitter is typically formed by coating a dielectric multilayer on a surface on which two rectangular prisms are adhered, and transmits P polarized light and reflects S polarized light at an angle of 90° C. Both of the transmittance and reflectivity are not less than 98%. Other polarizing beam splitters using special gratings are also available.

(7) Prism Polarizer

A uniaxial crystal has a different refractive index between an ordinary ray vertically vibrating to an optical axis direction and an extraordinary ray having a vibrating direction in a main cross section including an optical axis. Therefore, a combination of two prisms cut out from a uniaxial crystal can be a polarizer separating light having different vibrating surfaces.

Nicol prisms, Glan-Thomp son prisms, Glan-Foucault prisms, Glan-Taylor prisms, Rochon prisms, Wollaston prisms, etc. are available.

(8) Diffraction Grating

A diffraction grating having a small pitch has different transmittances between a TE wave and a TM wave and a capability of a polarizer. This is not called a polarizer, but can be used as a polarizer in the present invention.

When two polarization layers are used, they may be the same or different types.

Next, the polarization changing layer will be explained. When natural light is transmitted through a piece of a polarizer, e.g., a film polarizer, light utilization efficiency is slightly deteriorated. Particularly, it is desired that 100% of the light be used for the windows of buildings and automobiles, which are one of the objects of the present invention. The polarization changing layer is, as mentioned above, a layer changing P or S polarized light passed through a polarizer into the same S or P polarized light.

For the polarization changing layer, a polarization changing element including a lens, an aluminium plate, a double reflex crystal and a wavelength plate is sold by OPTICAL COATINGS JAPAN, etc. In addition, a method of emitting circular light between two reflective polarizers to efficiently emit only S or P polarized light is also used. Such commercial polarization changing elements, the thin film type polarization changing elements suggested by the present inventor and polarization changing elements using a liquid crystal disclosed in Japanese Laid-Open Patent Publication No. 2000-47032, etc. may be used.

Next, the transparent micro-magnetic head array will be explained.

The transparent micro-magnetic head array for use in the present invention include plural two-dimensionally located coils, which is a magnetic bead. Typical embodiments of the transparent micro-magnetic head array of the present invention are shown in FIGS. 5A, 5B and 6.

Figure 5A:
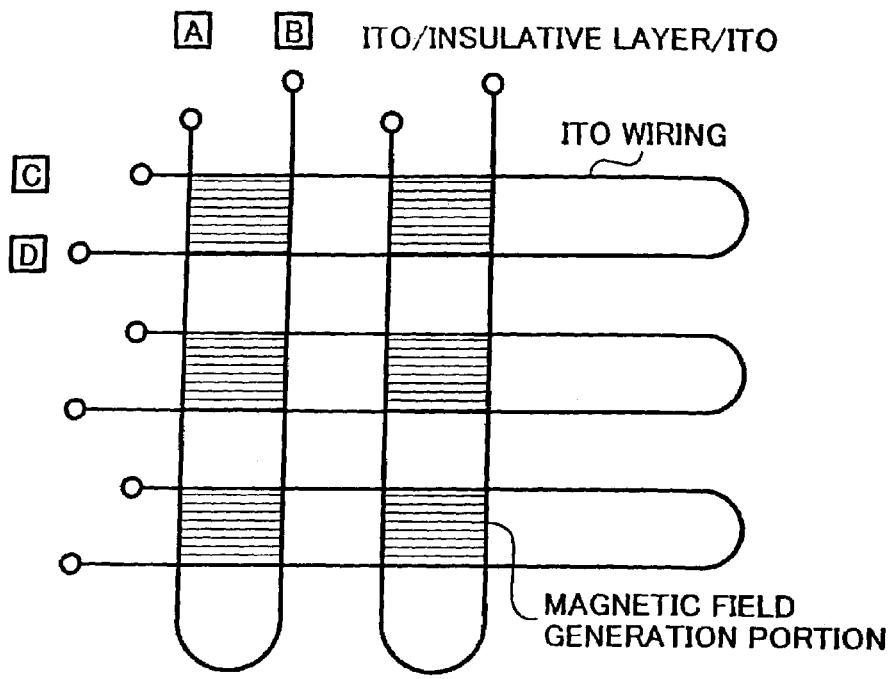
FIGS. 5A and 5B are schematic views illustrating the wiring of the micro-magnetic head array of the present invention.
Figure 5B:
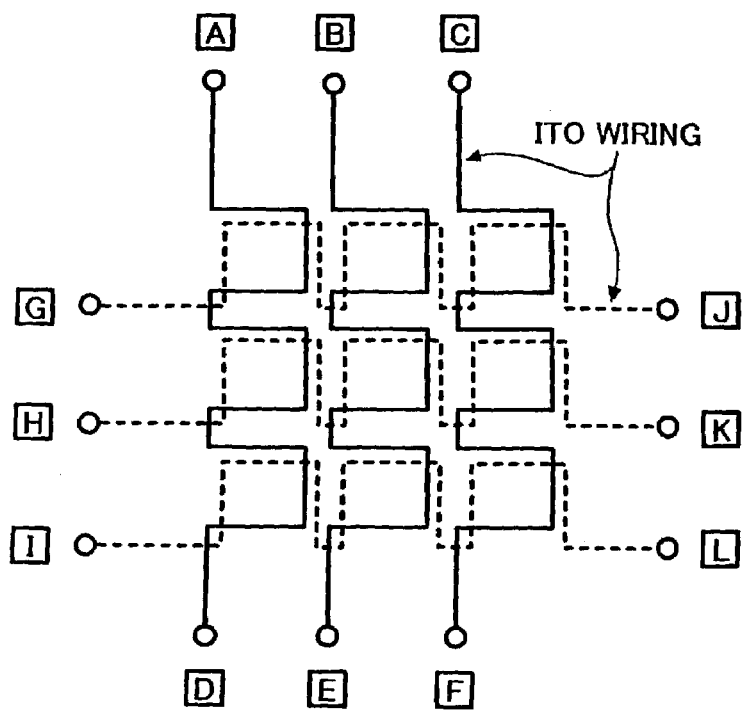
Figure 6:
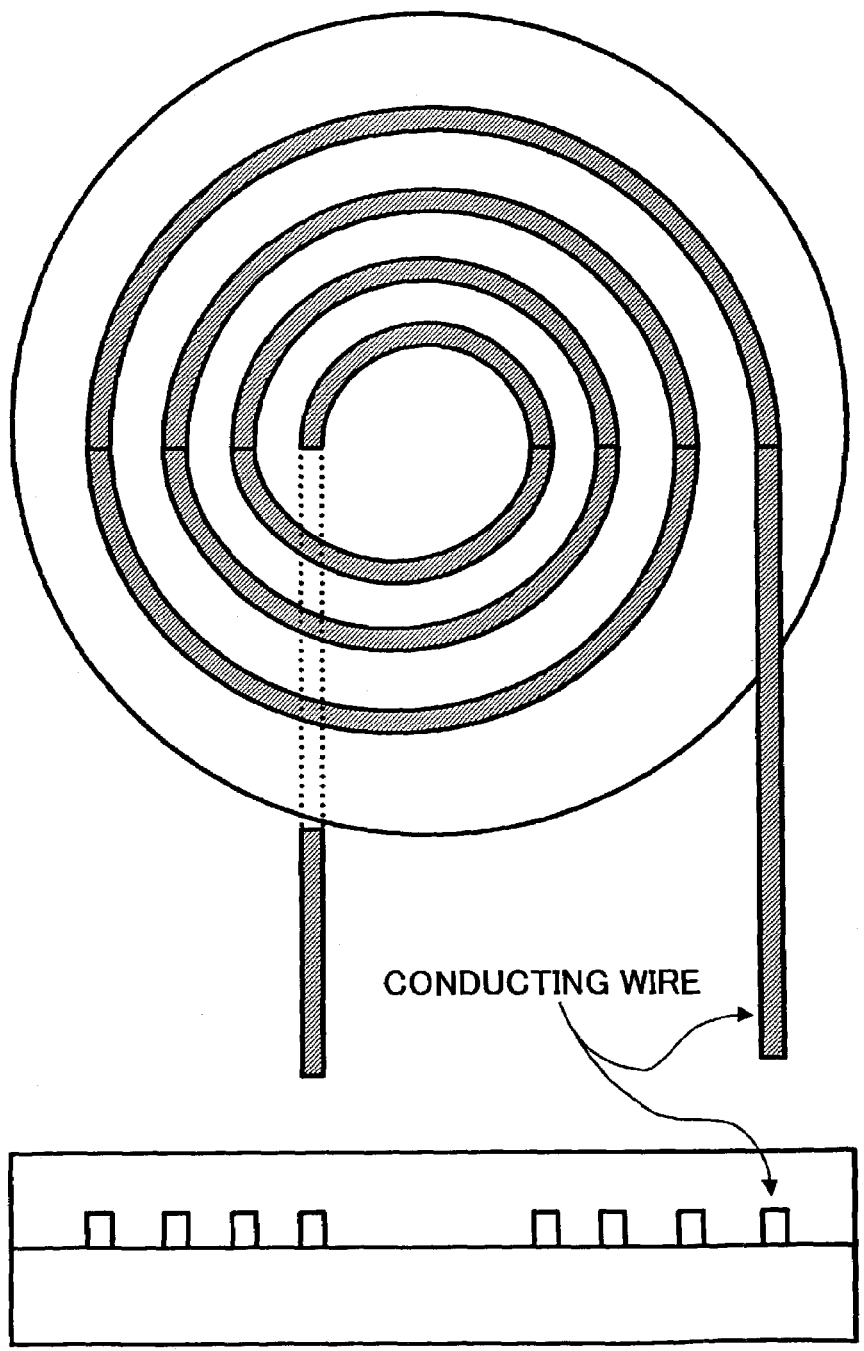
FIG. 6 is a schematic view illustrating the micro-magnetic head of the present invention.

FIGS. 5A and 5B show linear type magnetic heads and schematic views of the head wiring portions. FIG. 6 shows a plane-coil type magnetic head.

The two-dimensionally located magnetic heads can have currents at the same time when connected in series. When the two-dimensionally located magnetic head has a large area, it can be separated into several parts.

The linear type magnetic head shown in FIGS. 5A and 5B can selectively indicate an image using a strong magnetic field at an intersection of each magnetic head which is vertically and horizontally connected.

An outer diameter of each magnetic head is not particularly limited, and is preferably from about 200 μm to 1 mm when an image indication is not a main object as the present invention. The wiring preferably has a width from about 2 to 100 μm to decrease the heat generated at the magnetic head. The larger the wiring, the larger current can be applied thereto and the smaller dead space among the magnetic heads will be. The transparent micro-magnetic head array is preferably located as closely as possible to the layer having a magneto-optic effect on one or both sides thereof.

A shape of the magnetic head is not particularly limited, but a quadrangular coil is preferably used to decrease the dead space. When various coils are used, plural coil layers sandwiching insulative layers solve a problem of an overheat because of the lower current needed. As a method of eradicating a dead space incapable of controlling light, a method of forming plural layers of the transparent micro-magnetic head array and shifting a location of each layer can be used.

One of the important features of the present invention is that the micro-magnetic head array is transparent. The reason why the micro-magnetic head array can be transparent is as follows.

(1) Conventionally, metallic electroconductive materials such as opaque gold and copper have been used for coils. Further, metallic opaque high-permeability materials have been used for centers of the coils as core materials. In the present invention, the following transparent ITO film is used as the electroconductive material. In addition, the core is not needed because the wiring is changed from coiled wiring to linear wiring.

(2) A magnetic layer (a layer having a magneto-optic effect) is formed right over a micro-magnetic bead array, and the magnetic layer is closed to the head to improve the utilization efficiency of a magnetic field therefrom. Therefore, an image can be formed with a small amount of head driving current and even a linear wiring, not a magnetic coil having many turns, sufficiently magnetize the layer. The linear wiring can be formed in the ITO film.

(3) Coercivity of the magnetic layer is decreased such that the magnetic layer is easily magnetized. The layer can be magnetized with a small amount of current and the linear wiring can be used in the ITO film.

The electroconductive material for use in the micro-magnetic head array is preferably transparent electroconductive film in respect to transparency. The transparent electroconductive film has a high visual light transmittance and electroconductivity. Typical materials thereof include $SnO_2$, $In_2O_3$, etc. The indium oxide film includes tin as a dopant to decrease resistivity thereof, and the ITO film comes from Indium Tin Oxide. The ITO film has a thickness from about 0.1 to 5.0 μm, and a surface resistance from about 10 to 800Ω/$cm^2$. Other transparent electroconductive films such as zinc oxide films and transparent organic electroconductive films can also be used.

As transparent insulative materials for use in the micro-magnetic head array, typical organic and inorganic insulative materials can be used. However, as they need to have transparency and heat resistance, organic insulative materials such as transparent polyimide resins, fluorinated polyimide resins, copolymer resins formed from an octakis•hydridosilsesquioxane molecule and a bisphenylethynyl benzene molecule with a catalyst, silicon liquids, transparent fluorocarbon resins, olefin•maleimide copolymers, polyester resins, polyarylate resins, polyethersulfone resins, polycarbonate resins are preferably used. As the transparent polyimide resins, a brand name "Sunever" from Nissan Chemical Industries, Ltd. is preferably used. Particularly, a brand name "Sunever RN812" having little self-polarization when a voltage is applied thereto has not only a largely improved transparency not less than 93% when the thickness is 1 um, but also has a largely improved adherence to a ITO film substrate. In addition, the "Sunever RN812" has good solvent resistance, electric insulation, workability, low air permeability, low hygroscopicity and surface smoothness. Further, the "Sunever RN812" is very preferably used for the purpose of the present invention because of having a pyrolysis temperature not less than 450° C.

The fluorinated polyimide resin is developed by NTT Corp. and has a high transparency of about 90%, which is different from a conventional brown-colored fluorinated polyimide resin. At present, the fluorinated polyimide resin is commercially available as a brand name "OPI" from Hitachi Chemical Co., LTD. The fluorinated polyimide resin has a fluorine content of from 20 to 30%, and a heat-ray expansion coefficient of $5 \times 10^{-6}$/° C. However, the transparent polyimide resin as well as the fluorinated polyimide resin are expensive, and they may be layered on an olefin•maleimide copolymer film, and on a conventionally used polyester, polyarylate, polyethersulfone or polycarbonate film.

As the inorganic insulative materials, the above-mentioned dielectric materials can be used.

Methods of preparing the micro-magnetic head array are broadly classified to photolithography methods and electroforming methods. Various laser beams, a soft X-ray, ultraviolet light, etc. are used to form a wiring pattern. In modification of the wiring, it is essential that a conductive wire has a larger cross sectional area, i.e., a wider width and a higher height, in respect of decreasing the electric resistance. However, as mentioned above, a volume of insulative layer between the conductive wires is preferably smaller because the magnetic head pitch has a limit in terms of the image resolution.

A layer having a high-magnetic permeability on the linear wiring layer of the present invention improves efficiency of the magnetic field generation. A material having a high magnetic permeability, which converges a magnetic flux, located at the center of a typical coil as a core prevents dispersion of the magnetic flux and improves efficiency as a magnetic head. A magnetic field convergent portion of the linear wiring, i.e., a center between the lattice wiring, has the same effect. The layer having a high-magnetic permeability preferably has a thickness from 100 to 5,000 nm.

As transparent soft magnetic materials for use in the layer having a high-magnetic permeability, a thin film having a thickness not greater than 10 nm and high transparency of various conventionally used alloyed metals of pure iron, silicon steel, iron, nickel and cobalt such as Fe—Si—B and Co—Fe—Si-b can be used. However, organic magnetic materials transmitting visual light are preferably used. The magnetic permeability is preferably not less than 100, and more preferably not less than 1,000.

In the present invention, as an electric source for driving the micro-magnetic head array, a direct current converted from an alternate current from ordinary alternator can be used, and a secondary cell having a thickness not greater than 1 mm, which is called a paper battery, can also be used. A film-shaped lithium polymer secondary cell used in a notebook PC, a three-layered secondary cell formed of a polymer electrolyte using fluorocarbon polymer resins, which is coated with a lithium oxide and a graphite, can also be used. The electric power consumption is preferably not less than 1,000 mA an hour, and the voltage is preferably not less than 3 V. As a matter of course, a primary cell can also be used.

In addition, in the present invention, a solar battery which does not have to be exchanged is preferably used. The solar batteries include compound solar batteries, silicone solar batteries and organic solar batteries. The silicone solar batteries are mostly in practical use. The silicone solar batteries include monocrystal types, polycrystal types, amorphous types and their hybrid types. Any solar batteries may be used if they can directly be located on a light control window and efficiently used. A solar battery having a reflective film to increase the utilization can also be used. A combination with the solar battery and the secondary cell can also be used.

A solar battery located on a light control window preferably has visual light transmittance to improve light utilization inside a room. A dye sensitizing solar battery (Graetzel type) is preferably used because of having a high light transmittance.

The light control window of the present invention can be colored with a color filter. A color filter used for a liquid crystal display can be used to color a windowpane. As the color filter, a black matrix may be formed on a transparent substrate, and a color filter layer having each color of red, green and blue and a good light transmittance may be formed alone, or each magnetic head may have a different color layer. The color filter layer preferably has a thickness from 1 to 3 μm. A commercially available color filter may be adhered to the windowpane, and each magnetic head may be differently colored using an inkjet. An overcoat layer may be formed on the color filter layer to protect the color layer and increase the smoothness thereof. A method of forming the color filter includes typical methods such as staining methods, pigment dispersion methods, printing methods and electrodeposition methods.

In the light control window of the present invention, an electric feeding to the micro-magnetic head array may be controlled by a signal output from a light sensor. The light sensor in the present invention is a photodetector detecting an optical power. Specific examples of the light sensors include photoconductive cells such as light-sensitive tubes, CdS and PbS using a photoelectric effect; photovoltaic cells using a pn joint of silicone or germanium; and thermoelectric bodies, bolometers and Golay cells using heat efficiency. The light sensor detecting outside light strength controls a current amount supplied to the micro-magnetic head array to control light. The light sensor can automatically control light amount for a desired time if a desired light amount is set at the beginning.

A surface protection layer can be formed on most of the surfaces of the light control window of the present invention. As materials for forming the surface protection layer, inorganic materials such as $SiO_2$, $Ta_2O_5$, ITO, $MgF_2$, $Al_2O_3$, MgO, BeO, $ZrO_2$, $Y_2O_3$ and C, and their mixtures can be used. Organic resin protection layer formed of light-hardening resin compositions including a polymeric monomer and an oligomer as a main component, and hear-hardening resin compositions can also be used.

When the light control window of the present invention is used for a long time, the window is stained with a dust, etc. The window is not sufficiently cleaned through the polarization layer or protection layer. However, the window having a glass plate on the other side of the transparent substrate can be cleaned from both sides of the window.

Having generally described this invention, further understanding can be obtained by reference to certain specific examples which are provided herein for the purpose of illustration only and are not intended to be limiting.

EXAMPLES

Example 1

A transparent micro-magnetic head array was formed on a side of a polycarbonate film having a thickness of 75 μm, a length of 50 cm and a width of 50 cm as a transparent heat-resistant substrate. The micro-magnetic head array was prepared by the following method:

(1) an ITO layer, an insulative layer and another ITO layer were directly formed on the polycarbonate film;

(2) each ITO layer was formed by a sputtering method so as to have a thickness of 2 μm;

(3) the insulative layer was formed by a sputtering method so as to have a thickness of 0.5 μm;

(4) a linear wiring having the pattern of FIG. 5B was formed on each ITO layer by a photolithography method such that the wiring width was 10 μm, a space between coils (a periodic stance among A, B and C, and G, H and I) was 250 μm and an overlapped portion of the coil had a length of 235 μm (In FIG. 5B, coils represented by a full line and a dotted line are shown separately, but are overlapped actually);

(5) a current was vertically and horizontally applied using a marketed solar battery (In FIG. 5B, an electrode A is positive and D is negative, and G is positive and J is negative) ; and (6) each coil was connected in series and a switch was arranged at an end.

When a current of 500 mA was applied to the micro-magnetic head array, the overlapped portion of the coil had a magnetic field strength of 330 gauss.

Next, a layer having a magneto-optic effect formed of Bi-substituted rare-earth iron garnet ($Ce_1Y_2Fe_5O_{12}$) was formed on the micro-magnetic head array while the substrate had a temperature of 100° C. The layer had a thickness of 140 nm. Then, a XeCl excimer laser beam having a wavelength of 308 nm, an optical power 400 mj and a width of 0.5 mm was repeatedly irradiated to the layer several tens of times to heat and crystallize the Bi-substituted rare-earth iron garnet. The substrate was not damaged because the laser beam was absorbed more in the garnet than the substrate.

A coercivity of the layer having a magneto-optic effect measured by a vibration sample magnetometer (VSM) was 12 Oe when a magnetic field was vertically applied to the layer.

A marketed polarization changing layer from Ricoh Optical Industries, Co., Ltd. was formed on the thus prepared layer having a magneto-optic effect overlying the transparent micro-magnetic head array overlying the transparent substrate, and a polarization layer (a polarization and reflection film RDF from Sumitomo 3M, Ltd.) was formed on the other side of the transparent substrate. Polarization axes of the polarization changing layer and polarizer were fixed to have a minimum transmittance when a plane of polarization of the layer having a magneto-optic effect had a maximum rotation angle, i.e., when a current was applied to a positive direction, and to have a maximum transmittance when a current was applied to a negative direction.

The thus prepared optical element including the transparent substrate, the micro-magnetic head array overlying the transparent substrate, the layer having a magneto-optic effect overlying the micro-magnetic head array, the polarization changing layer overlying the layer having a magneto-optic effect and the polarization layer on the other side of the transparent substrate was adhered to a windowpane with an adhesive. In addition, a marketed amorphous silicone type solar battery having a voltage of 10 V was adhered to an extra space which the optical element is not adhered to as an electric source for driving the micro-magnetic head array. Further, a marketed light sensor (CdS) was adhered to another extra space which the optical element was not adhered to for detecting outside light amount and controlling a current for the micro-magnetic head array. When the outside light amount was large, a large amount of current was applied to the micro-magnetic head array to decrease the light amount transmitting through the window, and when outside light amount was small, the light amount transmitting through the window was increased to fix the light amount even when the outside light was large or small.

Next, the switch on the wiring connected to the micro-magnetic head array from the solar battery was turned on to reverse the current direction. The light transmittance of the position where the micro-magnetic head array was located was changed from 70% (in a negative direction) to 0% (in a positive direction). When the current was not applied, the light transmittance was an almost medium about 35%. These light transmittances could be maintained even when the current was turned off. Next, the light sensor circuit was connected to the electric circuit and the outside light amount was changed by a lamp, and the light transmittance could be fixed regardless of the light amount.

Further, after a heater wire and an insulative layer were formed on a side of the windowpane, the optical element was adhered on the other side of the windowpane. A current was applied to the heater wire to heat the surface of windowpane so as to have a temperature of 100° C. The light transmittance was changed from 70% to 0% with a half of the current applied to the micro-magnetic head array without a heater.

Example 2

A micro-magnetic head array was formed on a substrate in the same method as that of Example 1, and after a Ce-substituted rare-earth iron garnet layer having a thickness of 200 nm was formed on the micro-magnetic head array, a periodic structure was formed thereon by etching as shown in FIG. 3A using a photolithography method. The period 22 was 260 nm, the width 24 and separation distance 26 were both 130 nm and the height 28 was 200 nm. Different from Example 1, a layer structure including a transparent substrate, a layer having a magneto-optic effect with the periodic structure overlying the substrate, the micro-magnetic head array overlying the layer having a magneto-optic effect and a polarization changing layer without a polarization layer was prepared. When a current was applied to the micro-magnetic head array in the same method of Example 1, the light transmittance could be controlled from 0 to 70%.

Example 3

After a micro-magnetic head array was formed on a substrate in the same method of Example 1, an ITO film having a thickness of 100 nm was formed thereon. As a layer having magneto-optic effect, an organic transparent magnetic material $K^{I}[(V^{II}_{0.6}V^{III}_{0.4})_x Cr^{II}_{1-x}][Cr^{III}(CN)_6]$ having a uniform thickness of about 5 µm instead of the Bi-substituted rare-earth iron garnet in Example 1 was formed on the ITO film. A composition ratio of metal ion X= 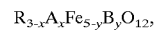 was 0.22, and the layer had a color of green. A light sensor and a magnetic sensor were not formed. When a current was applied to the micro-magnetic head array in the same method of Example 1, the light transmittance could be controlled from 8 to 60%.

This document claims priority and contains subject matter related to Japanese Patent Application No. 2002-158353 filed on May 30, 2002, incorporated herein by reference.

Having now fully described the invention, it will be apparent to one of ordinary skill in the art that many changes and modifications can be made thereto without departing from the spirit and scope of the invention as set forth in the following claims.

Obviously, numerous modifications and variations of the present invention are possible in light of the above teachings. It is therefore to be understood that within the scope of the appended claims, the invention may be practiced otherwise than as specifically described herein.

What is claimed is:

1. A light control window, comprising:
   a transparent window substrate; and
   an optical element configured to change a light transmittance there through upon application of a magnetic field, the optical element comprising:
   a first polarization layer;
   one of a second polarization layer and a polarization changing layer;
   a layer having a magneto-optic effect located between the first polarization layer and the one of the second polarization layer and the polarization changing layer; and
   a micro-magnetic head array configured to apply the magnetic field to the optical element main body.

2. The light control window of claim 1, wherein the layer having the magneto-optic effect comprises a magnetic material forming a periodic groove thereon.

3. The light control window of claim 2, wherein the period of the periodic groove is not greater than a visible wavelength of 400 nm.

4. The light control window of claim 3, wherein the period of the periodic groove is between 50 and 400 nm.

5. The light control window of claim 1, wherein the optical element main body further comprises:
   a transparent substrate located between the first polarization layer and said one of the second polarization layer and the polarization changing layer.

6. The light control window of claim 5, wherein the transparent substrate is a plastic film.

7. The light control window of claim 5, wherein the transparent substrate comprises a colored transparent material.

8. The light control window of claim 1, wherein the layer having the magneto-optic effect comprises a transparent magnetic material.

9. The light control window of claim 8, wherein the transparent magnetic material is an inorganic magnetic material.

10. The light control window of claim 9, wherein the inorganic magnetic material is a rare-earth iron garnet having the following formula:

$$R_{3-x}A_xFe_{5-y}B_yO_{12},$$

wherein x is a number greater than 0.2 and less than 3; y is a number not less than 0 and less than 5; R is a rare earth metal selected from the group consisting of Y, Sm, Eu, Gd, Tb, Dy, Ho, Er, Tm, Yb and Lu; A is a member selected from the group consisting of Bi, Ce, Pb, Ca and Pt; and B is a member selected from the group consisting of Al, Ga, Cr, Mn, Sc, In, Ru, Rh, Co, Fe, Cu, Ni, Zn, Li, Si, Ge, Zr and Ti.

11. The light control window of claim 8, wherein the transparent magnetic material is an organic magnetic material.

12. The light control window of claim 1, wherein the layer having the magneto-optic effect is a transparent combined layer comprising a plurality of dielectric layers and a plurality of magnetic layers.

13. The light control window of claim 12, wherein the transparent combined layer comprises the following layer composition:

$\{(GM)_n(MG)_n\}_m$, wherein G represents the dielectric layer; M represents the magnetic layer; and each of n and m are an integer from 1 to 40.

14. The light control window of claim 1, further comprising a transparent protection layer as an outermost layer.

15. The light control window of claim 14, wherein the transparent protection layer is releasable.

16. The light control window of claim 1, further comprising a glass plate located overlying the optical element through which light enters.

17. The light control window of claim 1, further comprising a solar battery configured to drive the micro-magnetic head array.

18. The light control window of claim 1, wherein the micro-magnetic head array comprises a transparent electric wiring layer.

19. The light control window of claim 1, wherein the micro-magnetic head array can selectively be electrified.

20. The light control window of claim 1, wherein the micro-magnetic head array is connected in series.

21. The light control window of claim 1, wherein the micro-magnetic head array is separately wired in a first direction and a second direction, and wherein the first direction is substantially perpendicular to the second direction.

22. The light control window of claim 1, wherein the micro-magnetic head array comprises a linear magnetic head.

23. The light control window of claim 1, wherein the micro-magnetic head array comprises a coiled magnetic head.

24. The light control window of claim 1, further comprising:
a light sensor configured to detect a light strength, wherein the light sensor produces a signal to change the light transmittance of the optical element.

25. The light control window of claim 1, further comprising:
an auxiliary heater configured to heat the layer having the magneto-optic effect.

26. The light control window of claim 1, wherein a polarization-changed light in the polarization changing layer is a P polarized light.

27. The light control window of claim 1, wherein the light transmittance can be controlled between 0 and 100%.

28. The light control window of claim 1, wherein the layer having the magneto-optic effect in the optical element has a thickness from about 5 to about 200 nm.

29. The light control window of claim 1, wherein the layer having the magneto-optic effect has a coercivity not greater than 1,000 Oe.

30. The light control window of claim 29, wherein the layer having the magneto-optic effect has a coercivity between 10 and 300 Oe.

31. An automobile having the light control window according to claim 1.

32. A building having the light control window according to claim 1.

33. An optical element configured to change a light transmittance there through upon application of a magnetic field, said optical element comprising:
a first polarization layer;
one of a second polarization layer and a polarization changing layer;
a layer having a magneto-optic effect located between the first polarization layer and the one of the second polarization layer and the polarization changing layer; and
a micro-magnetic head array configured to apply the magnetic field to the optical element.

* * * * *